United States Patent [19]

Shuto

[11] Patent Number: 5,180,041

[45] Date of Patent: Jan. 19, 1993

[54] CURRENT COLLECTING APPARATUS FOR TRANSPORT VEHICLE

[75] Inventor: Masamoto Shuto, Tokyo, Japan

[73] Assignee: HSST Corporation, Tokyo, Japan

[21] Appl. No.: 797,215

[22] Filed: Nov. 25, 1991

[30] Foreign Application Priority Data

Nov. 27, 1990 [JP] Japan .................................. 2-324587

[51] Int. Cl.$^5$ ............................................... B60L 5/39
[52] U.S. Cl. ...................................... 191/53; 191/57; 191/65
[58] Field of Search ............... 191/59.1, 45 R, 45 A, 191/47, 49, 53, 57, 58, 64, 65, 66, 68, 70, 85, 86, 88

[56] References Cited

U.S. PATENT DOCUMENTS

| | | | |
|---|---|---|---|
| 2,537,866 | 1/1951 | Tanner | 191/57 X |
| 2,958,743 | 11/1960 | Moore | 191/65 X |
| 3,146,866 | 9/1964 | Frostick et al. | 191/53 X |
| 4,053,035 | 10/1977 | Uchiyama et al. | 191/45 A |
| 4,106,600 | 8/1978 | Mihirogi | 191/53 X |
| 4,246,986 | 1/1981 | Shuto | 191/49 X |

FOREIGN PATENT DOCUMENTS 1301735 4/1987 U.S.S.R. .................... 191/45 R

Primary Examiner—Michael S. Huppert
Assistant Examiner—Scott L. Lowe
Attorney, Agent, or Firm—Koda & Androlia

[57] ABSTRACT

A current collecting apparatus for a transport vehicle such as a linear motor car comprises a mounting member for mounting said apparatus for a truck body of a transport vehicle through an insulator. A supporting member is provided on the mounting member such that the supporting member can be moved in a transverse direction of the transport vehicle by a couple of mount arms rotatably supported to the mounting member. Collecting shoes are supported at the lower end of each of the support arms, respectively, for receiving electric power supplied by a trolley rail. Each of the support arms comprises a couple of joint arms forming a parallelogram linkage for maintaining good contact between the trolley rail and the collector shoes. When the transport vehicle travels along curved tracks, the support arms incline in the transverse direction of the transport vehicle against an elastic force of a contracting spring so as to keep contact between the collecting shoes and the trolley rail.

8 Claims, 6 Drawing Sheets

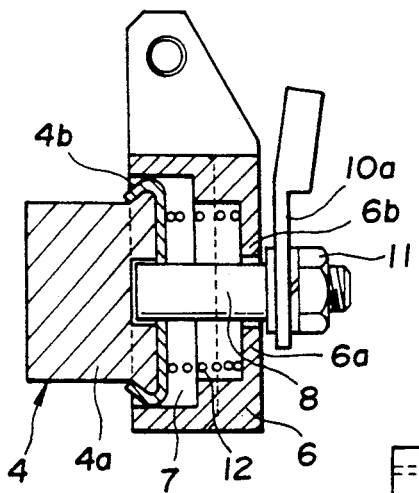
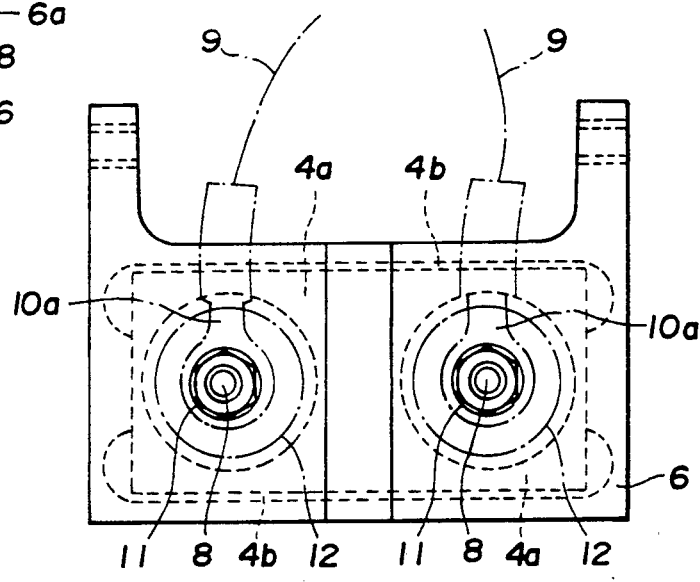
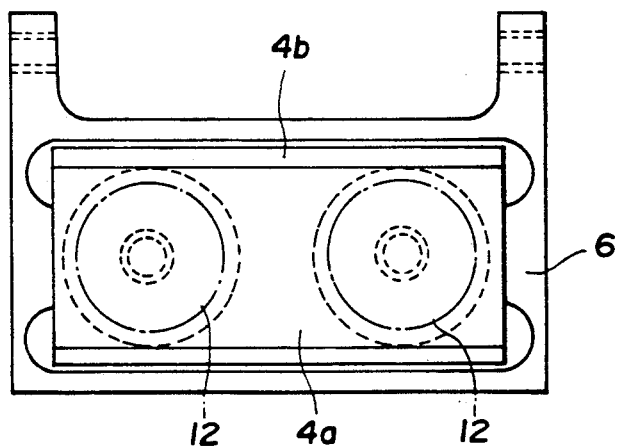

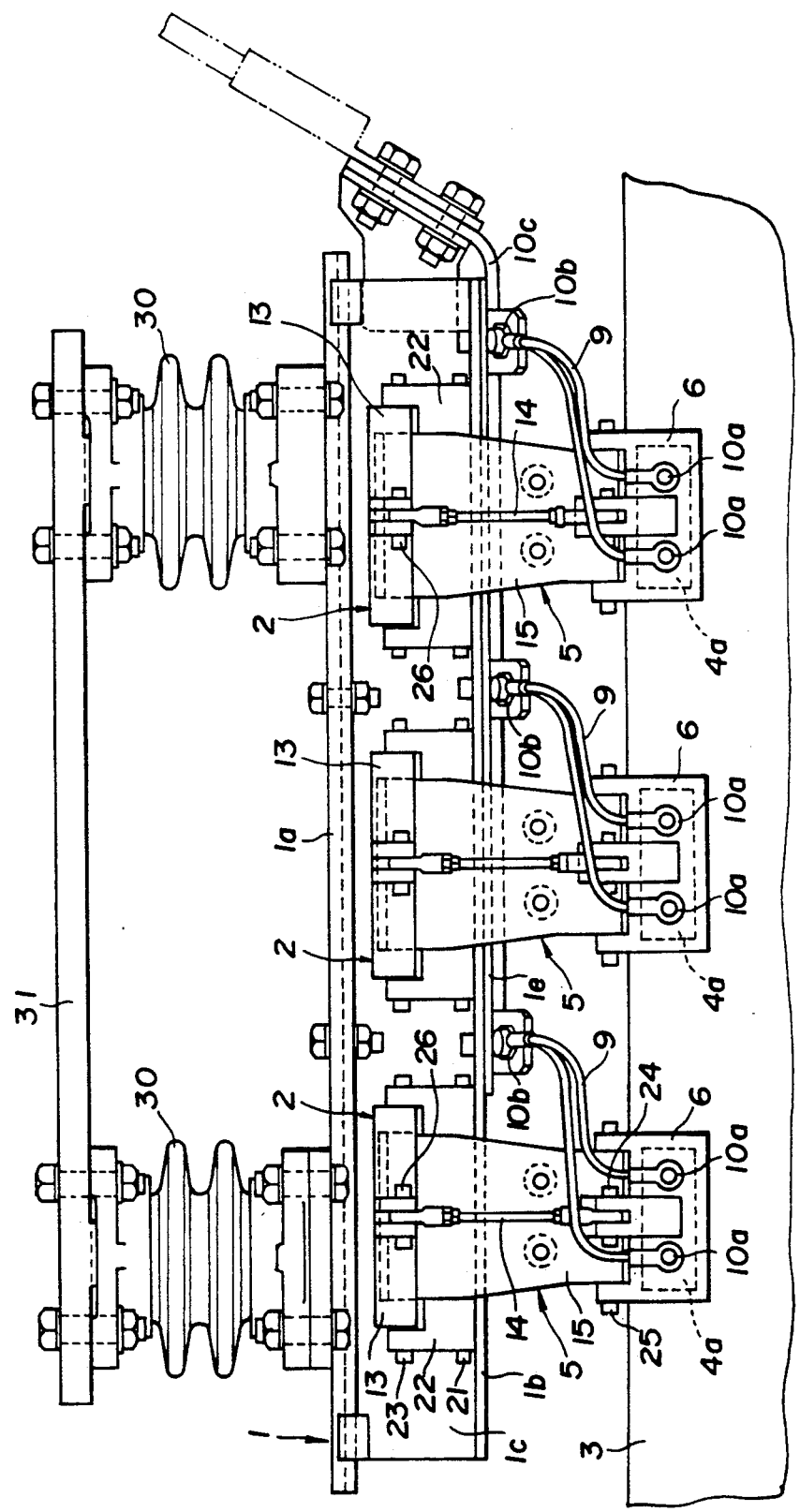

CURRENT COLLECTING APPARATUS FOR TRANSPORT VEHICLE

BACKGROUND OF THE INVENTION

1. Field of the Invention:

The present invention relates to a current collecting apparatus suitable for supplying power to a transport vehicle, particularly, a railway vehicle driven by a linear motor system or a train using a magnetic levitation system.

2. Description of the Prior Art:

Generally, a transport vehicle such as a railway vehicle driven by a linear motor system or a train adopting a magnetic levitation system receives power from a trolley rail laid on ground track or a high level track on which the vehicle travels and connected to an electric power supply. The power is supplied to such a transport vehicle through a current collecting apparatus. Note that the trolley rail is also known as a third rail.

When the transport vehicle travels along curved tracks, a relative variance results between the center line of the current collecting apparatus in parallel with the longitudinal direction of the transport vehicle on which the current collecting apparatus is installed and the center line of the trolley rail in a transverse direction of the vehicle body. In a system in which the current collecting apparatus comes in contact with both side surfaces of the trolley rail through a couple of collector shoes, the trolley rail is sandwiched between the two collector shoes through which power is received. In such a system, such relative variance makes contact pressure put by the collector shoes on the surfaces of the trolley rail unbalanced. In some cases, one of the collector shoes is even moved away from the trolley rail. The current collecting apparatus can be designed so that the contact between the collector shoes and the surfaces of the trolley rail is sustained even if such relative variance results. In such a case, however, inclination may be occurred between the contact surfaces of the collector shoes and the side surfaces of the trolley rail, resulting in reduced contact area between the collector shoes and the trolley rail. In addition, the reduced contact may give rise to partial abrasion of the collector shoes and the trolley rail.

SUMMARY OF THE INVENTION

It is therefore a primary object of the present invention to provide a current collecting apparatus for a transport vehicle such as railway vehicle and railway train which ensures a couple of collector shoes provided in the current collecting apparatus always coming in contact wtih surfaces on both sides of a trolley rail under equivalent pressure, even when the transport vehicle is jolted to the transverse direction thereof or even when the transport vehicle travels along curved tracks.

it is another object of the present invention to provide a current collecting apparatus for transport vehicle which sustains good contact between its collector shoes and trolley rail even when a big relative variance is resulted between the current collecting apparatus and the trolley rail.

It is a further object of the present invention to provide a current collecting apparatus for a transport vehicle which keeps contact surfaces of each of collector shoes against a trolley rail in a predetermined inclination relative to a mounting member for installing the current collecting apparatus on a truck body of the transport vehicle, sustaining a large contact area between each of the collector shoes and the side surface of the trolley rail at the time.

According to the present invention, the current collecting apparatus for a transport vehicle is provided wtih a mounting member fixed through an insulator to a truck body of the transport vehicle, a couple of collector shoes coming in contact with each of surfaces on both sides of a trolley rail laid on ground track or high level track on which the transport vehicle travels and connected to an electric power supply and a couple of support arms supported to the mounting member for holding both collector shoes. The support arms are positioned symmetrically to the center line of the mounting member which is in parallel with the longitudinal direction of the transport vehicle. One end of each of the support arms is supported to the mounting member whereas the other end serves as a collector shoe holder for holding one of the collector shoes in a flexible manner so that each of the collector shoes can slide backward and forward in a transverse direction to the longitudinal direction of a body of the transport vehicle. The collector shoe holder is provided with a spring for applying pressure to the collector shoe so as to keep the collector shoe coming in contact wtih the trolley rail.

According to the current collecting apparatus for transport vehicle in accordance with the present invention as is described above, pressure to keep the collector shoes coming in contact with the trolley rail is maintained by the elastic force of the spring and the flexible holding of the collector shoes by the collector shoe holders when a relative variance in the transverse direction of the body of the transport vehicle between the center line of the mounting member of the current collecting apparatus in parallel wtih the longitudinal direction of the transport vehicle and the center line of the trolley rail is small during the transport vehicle travels along curved tracks having a large radius of curvature.

In accordance with the present invention, each of the support arms includes a couple of joint arms. One end of each of the joint arms is rotatably supported to the mounting member by means of a first axis parallel to the center line of the mounting member which is in parallel with the longitudinal direction of the transport vehicle. The other end of each of the joint arms is rotatably connected to the collector shoe holder by a second axis parallel to said center line of the mounting member.

The distance between the first axis and the second axis is the same regarding all the four support arms. The distance between a first axis and another first axis of two joint arms constituting a support arm is equal. Distance between the second axis and the other second axis of the two joint arms constituting a support arm is equal. Two joint arms constituting a support arm form a parallelogram linkage. The two support arms are pulled toward each other by the tensile force of a spring stretched between the two support arms.

According to the current collecting apparatus for transport vehicle in accordance wtih the present invention as is described above, the collector shoes which are to be in contact wtih the trolley rail can be moved along a great distance in the transverse direction of the transport vehicle by the rotation of the support arms around its first axis taken as a center of rotation, when the transport vehicle travels along curved tracks having a small radius of curvature, resulting in a large relative variance between the center lines of the current collecting apparatus and the trolley rail. At that time, since the two joint arms constituting a support arm form a parallelogram linkages, inclinations of the contact surfaces of the collector shoes relative to the side surfaces of the trolley rail remain unchanged notwithstanding the magnitude of the relative variance. Accordingly, the pressure to keep the collector shoes coming in contact with the trolley rail is maintained and, thus, the good contact between the collector shoes and the trolley rail is maintained.

In one aspect of the present invention, a supporting member is slidably supported on the mounting member in such a way that the position of the supporting member relative to the mounting member can be shifted in a direction perpendicular to the longitudinal direction of the transport vehicle and in the transverse direction of the transport vehicle. A first end of each of the support arms is rotatably supported to respective one end of the supporting member. Return springs are installed between the supporting member and the mounting member. The return springs restore the aforementioned first ends of the support arms to their original locations so as to keep the positions of the support arms symmetrical to the center line of the mounting member parallel to the longitudinal direction of the transport vehicle. This location of the supporting member is called as a neutral location hereinafter.

Preferably, in said aspect of the present invention, the supporting member is supported by a couple of mount arms. One end of each of the mount arms is rotatably supported to the mounting member at a first end thereof by a third axis parallel to the center line described previously. A second end of each of the mount arms is rotatably connected to the supporting member by a fourth axis parallel to said center line. In this way, the supporting member is movably supported on the mounting member by the mount arms in the transverse direction of the body of the transport vehicle relative to the mounting member. The return springs are installed between the mounting member and the fourth axis.

According to the current collecting apparatus for the transport vehicle in accordance with the present invention as is described above, the supporting member can be moved relative to the mounting member in one transverse direction of the body of the transport vehicle against the elastic force of one of the return springs and, in addition, the support arms rotate at the first end thereof relative to the supporting member making the firs taxes as centers of rotation when the transport vehicle travels along curved tracks having a small radius of curvature, resulting in a large relative variance between the center lines of the current collecting apparatus and the trolley rail. Accordingly, the collector shoes are allowed to move along a great distance in the transverse direction of the body of the transport vehicle. As a result, good contact between the collector shoes and the trolley rail can be maintained.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through several views and wherein:

FIG. 3 shows a front cross-sectional view of a collector shoe holder used in the embodiment shown in FIG. 1.

FIG. 4 and FIG. 5 show both side views of the collector shoe holder shown in FIG. 3.

FIG. 8 shows an overall side view of the embodiment shown in FIG. 1.

DETAILED DESCRIPTION OF THE PREFERRED EMBODIMENTS

Figure 1:
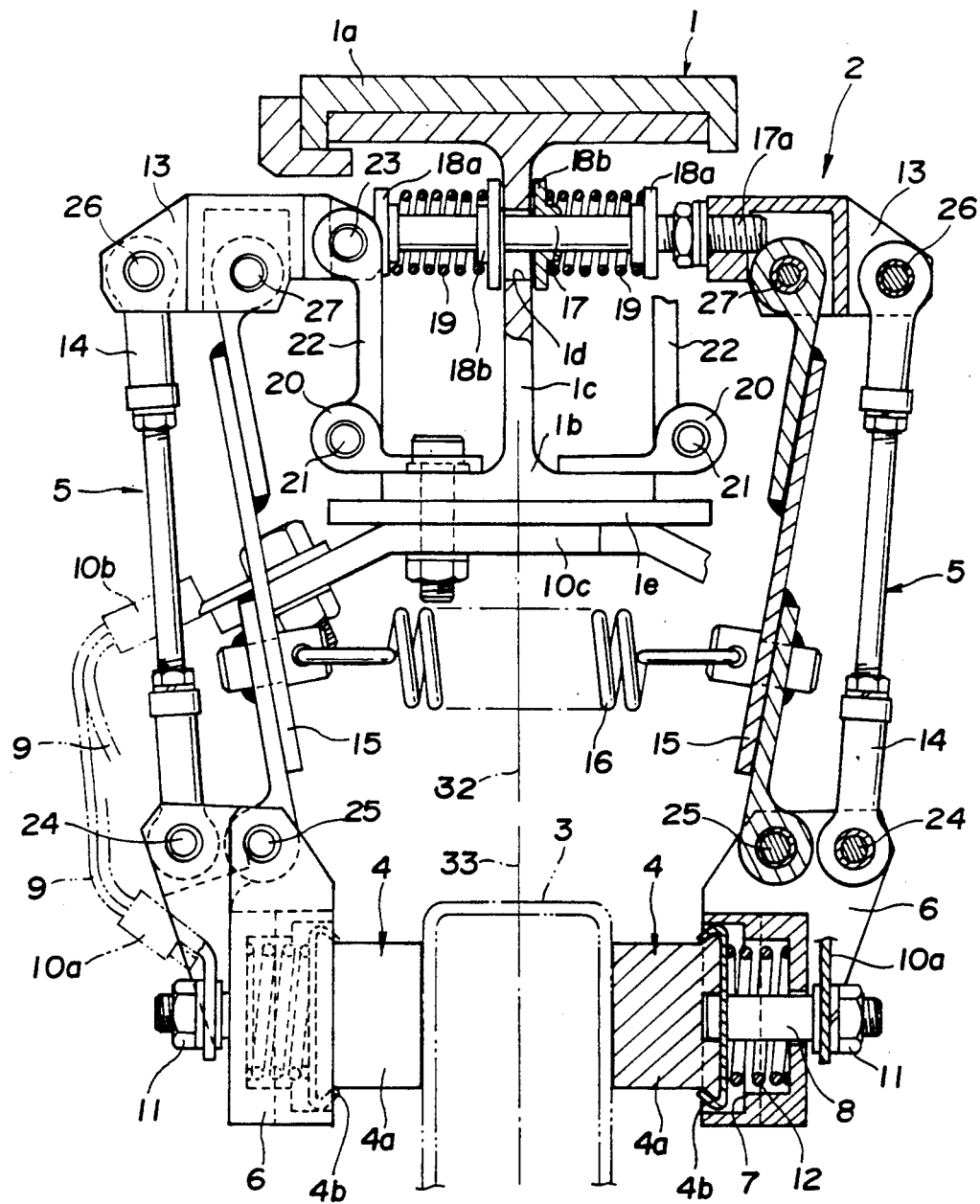
FIG. 1 shows a partial front view of an embodiment implementing the current collecting apparatus in accordance wtih the present invention.
Figure 2:
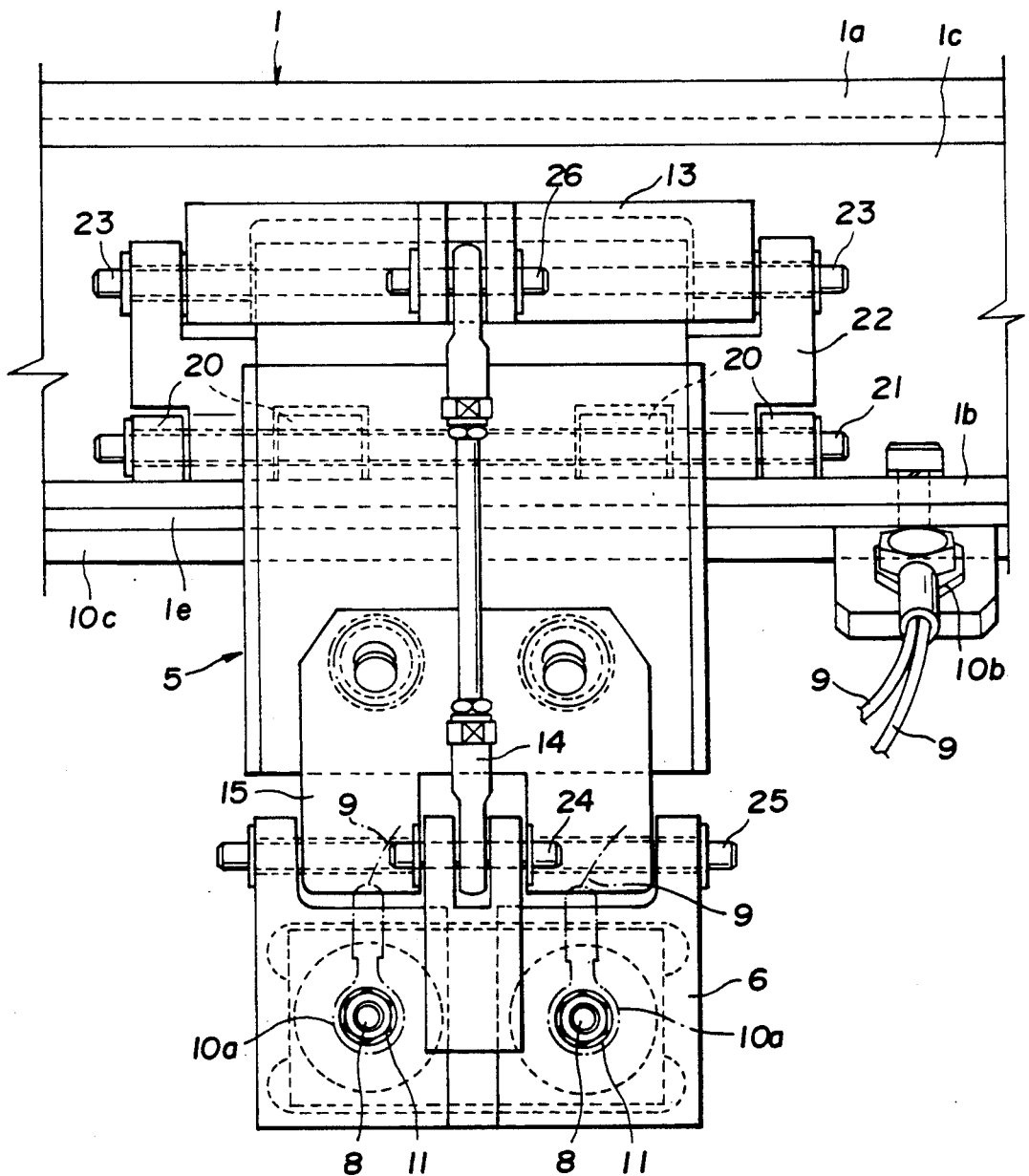
FIG. 2 shows a partial side view of the embodiment shown in FIG. 1.

FIGS. 1 and 2 show an embodiment implementing a unit of a current collecting apparatus in accordance with the present invention. The current collecting apparatus can be used in a linear motor car under magnetic levitation system, a typical transport vehicle.

The embodiment implementing the current collecting apparatus is equipped wtih a mounting member 1, a supporting member 2, a couple of support arms 5, collector shoe holders 6, collector shoes 4 and springs 12. The mounting member 1 is fixed to a truck body of a transport vehicle denoted by reference numeral 31 through insulators 30 which are shown in FIG. 8. The collector shoe holders 6 are supported to the lower ends of the support arms 5. The collector shoes 4 are held by the collector shoe holders 6 in such a way that the collector shoes 4 can be moved slidably with respect to the holders 6. The springs 12 are used for applying pressure to the collector shoes 4 so as to keep the collector shoes 4 coming in contact wtih a trolley rail 3 laid on ground track or a high level track and connected to an electric power supply.

FIG. 1 is a front view of the current collecting apparatus in which a portion thereof is shown in cross-sectional view on a plane perpendicular to the longitudinal direction of the transport vehicle. As shown in FIG. 1, the mounting member 1 comprises an upper horizontal flat plate 1a, a lower horizontal flat plate 1b and a flat, vertical joining plate 1c joining the upper and lower horizontal flat plates 1a and 1b. The plates 1a, 1b and 1c together constitute a mounting member in H-shaped cross-section. The upper plate 1a is fixed to the truck body 31 of the transport vehicle through the insulators 30.

The supporting member 2 comprises a shaft portion 17 at the center thereof and arm supporting elements 13 at both ends thereof for supporting the support arms 5. The shaft portion 17 penetrates a through hole 1d formed across the vertical joining plate 1c of the mounting member 1, allowing the supporting member 2 to shift freely along the transverse direction of the truck body 31 of the transport vehicle (the horizontal direction in FIG. 1). In this way, the position of the supporting member 2 relative to the mounting member 1 can be changed.

In order to support the supporting member 2 on the mounting member 1, a couple of mount arms 22 are provided on both sides of the vertical joining plate 1c. The upper portion of each of the mount arms 22 is rotatably connected to the arm supporting element 13 by an axis 23 whereas its lower portion is rotatably supported to a bearing 20 by an axis 21. The bearing 20 is fixed on the lower plate 1b by a bracket. The mount arm 22 can be rotated freely around the axes 21 and 23. The shaft portion 17 is formed wtih male screw threads 17a and equipped wtih stoppers 18a at its ends. Each of the male screw threads 17a is screws into a female screw thread formed on the arm supporting element 13. Each of the stoppers 18a is secured on the male screw thread 17a and serves as a stopper for receiving one end of a return spring 19. The shaft portion 17 also is equipped slidably with spring bearings 18b close to its center. The spring bearings 18b are used for holding one end of each of return springs 19 which serve as sources of sliding force in a direction parallel to the axial direction of the shaft portion 17. These components are assembled as follows. The lower ends of the mount arms 22 are rotatably supported to the bearings 20 by the axes 21 first. Then, the upper ends of the mount arms 22 are rotatably connected to the arm supporting elements 13 by the axes 23. The shaft portion 17 is then inserted to pass through the through hole 1d formed across the vertical joining plate 1c of the mounting member 1. Subsequently, the return spring 19 is placed around the shaft portion 17 between the spring bearing 18b slideably mounted on the shaft portion 17 and the stopper 18a fixed on the shaft portion 17. Finally, the arm supporting element 13 is fixed to the shaft portion 17 by screwing in the male screw thread 17a at the end of the shaft portion 17 through the female screw thread of the arm supporting element 13. The axes 21 and 23 are installed in a direction parallel to the longitudinal direction of the transport vehicle at locations symmetrical to the center line 32 of the mounting member 1. The distance between the center of the axis 21 and the center of the axis 23 on one of the mount arms 22 is made the same as the distance between the center of the axis 21 and the center of the axis 23 on the other mount arm 22. The distance between one of the axes 23 and the other axis 23 can be made equal to the distance between one of the axes 21 and the other axis 21 by adjusting the coupling between the male and female screw threads on the shaft portion 17 and the arm supporting element 13. In this way, the mount arms 22, the lower horizontal plate 1b and the shaft portion 17 together form a parallelogram linkage. The supporting member 2 can be moved in the transverse direction of the truck body 31 of the transport vehicle, against the elastic forces of the return spring 19 while maintaining a horizontal orientation. The elastic force of each of the return springs 19 has such a magnitude that with no external force applied to the supporting member 2, the mount arms 22 are sustained at positions parallel to the vertical joining plate 1c of the mounting member 1, and the supporting member 2 is sustained at its original, neutral position.

The support arms 5 each comprise a pair of joint arms 14 and 15. The upper end of the joint arm 14 is rotatably supported to the arm supporting element 13 by an axis 26 parallel to the center line of the mounting member 1 in the longitudinal direction of the transport vehicle. The lower end of the joint arm 14 is rotatably connected to the collector shoe holder 6 by an axis 24 parallel to the center line of the mounting member 1 in the longitudinal direction of the transport vehicle. Similarly, the upper end of the joint arm 15 is rotatably supported to the arm supporting element 13 by an axis 27 parallel to the center line of the mounting member 1 in the longitudinal direction of the transport vehicle. The lower end of the joint arm 15 is rotatably connected to the collector shoe holder 6 by an axis 25 parallel to the center line of the mounting member 1 in the longitudinal direction of the transport vehicle. The joint arm 15 is installed closer to the center line 32 than the joint arm 14. The distance between the center line of the axis 26 and that of the axis 24 of the joint arm 14 is made equal to the distance between the center line of the axis 27 and that of the axis 25 of the joint arm 15. In addition, the distance between the center line of the axis 26 and that of the axis 27 on the arms supporting element 13 is made equal to the distance between the center line of the axis 24 and that of the axis 25 on the collector shoe holder 6. As such, the joint arms 14 and 15 form a parallelogram linkage in conjunction wtih the axes 24, 25, 26 and 27. It should be noted that the configuration of the joint arm 14 is designed so as to allow the distance between the center line of the axis 26 and that of the axis 24 to be adjusted. If necessary, the distance between the center line of the axis 26 and that of the axis 24 of the joint arm 14 can be made different from the distance between the center line of the axis 27 and that of the axis 25 of the joint arm 15 as may be required in some cases.

As shown in FIG. 3 to 5, the collector shoe holder 6 has an accommodation space 7 with a rectangular opening on its side facing the trolley rail 3. In the accommodation space 7, the collector shoe 4 is slidably supported through the opening. The collector shoe 4 comprises a main body 4a and an installation plate 4b hooked on a protrusion provided on the back of the main body 4a. The main body 4a has a shape of rectangular parallelopipedon and is made of material having good electrical conductivity. A couple of conductive pins 8 are attached to the installation plate 4b. The conductive pins 8 protrude out of the accommodation space 7 of the collector shoe holder 6 through a through hole 6b formed on a bottom plate 6a which is provided as a base of the accommodation space 7. A terminal plate 10a is attached to the conductive pins 8 by a nut 11. One end of an electric power transmission lead 11 is fixed to the terminal plate 10a. Another terminal plate 10b attached to the other end of the electric power transmission lead 9 is linked to a current collecting plate 10c fixed on the lower plate 1b of the mounting member 1 through an insulating plate 1e which prevents current from flowing from the current collecting plate 10c to the lower plate 1b.

A couple of coil springs 12 are installed in the accommodation space 7 of the collector shoe holder 6 between the bottom plate 6a and the collector shoe 4. The coil springs 12 each have a center coinciding wtih one of the conductive pins 8. The coil springs 12 are placed in a direction so as to press the main body 4a of the collector shoe 4 against a side surface of the trolley rail 3. The support arms 5 each comprises the inner joint arm 15 and the outer joint arm 14. Both ends of a spring 16 are hooked on the inner joint arms 15 so that the collector shoes 4 supported at the lower portion of the support arms 5 are pressed in directions against the trolley rail 3. The elastic force of the coil springs 12 is greater than that of the spring 16 whereas the elastic force of the spring 19 is larger than or equal to that of the coil springs 16.

In the current collecting apparatus having the configuration described above, the main bodies 4a of the collector shoes 4 come in contact wtih the surfaces (vertical surfaces) on both sides of the trolley rail 3, sliding thereon. Electric power is received through the collecting shoes 4.

Figure 6:
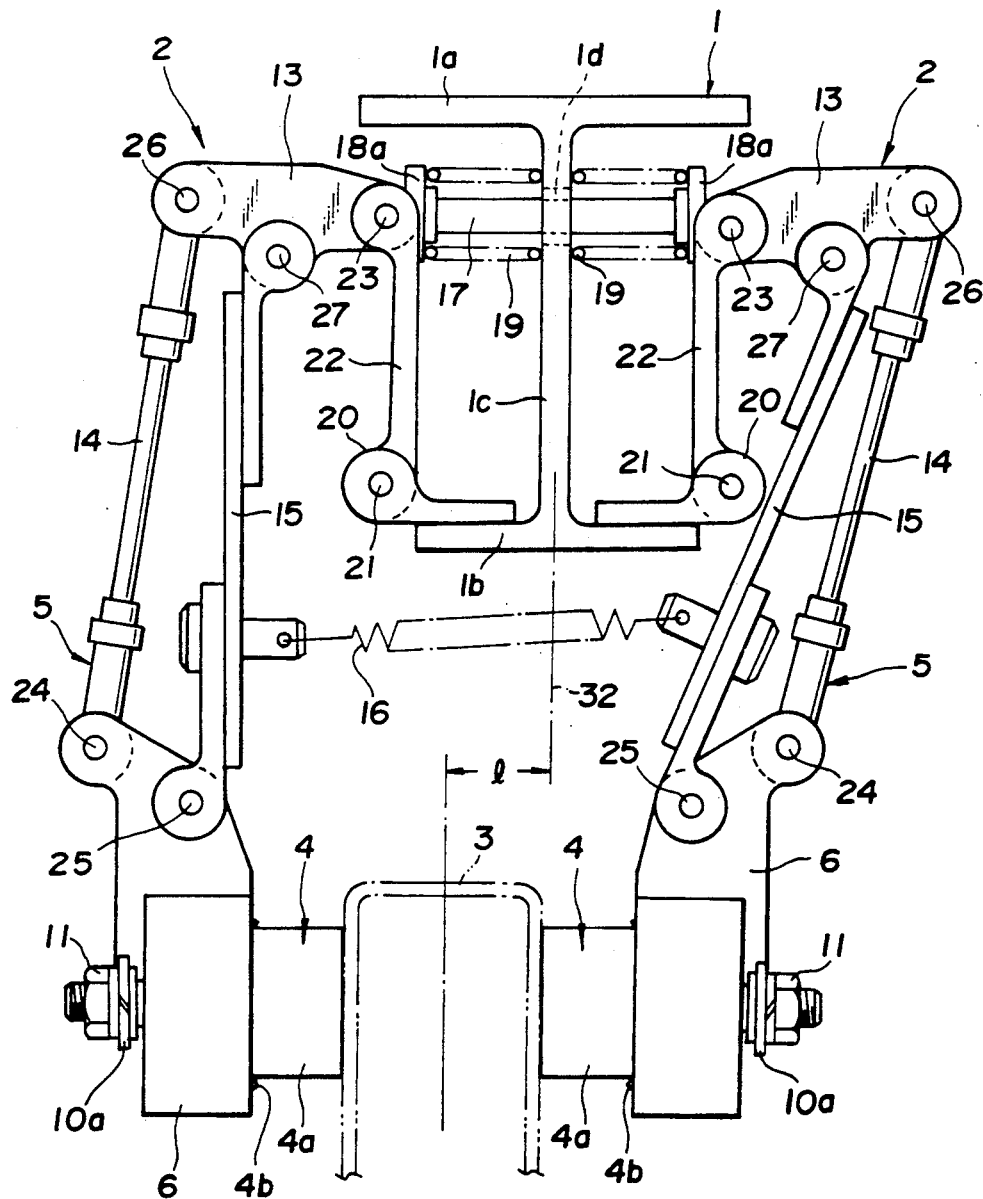
FIGS. 6 and 7 show front views illustrating operating states of the embodiment shown in FIG. 1.
Figure 7:
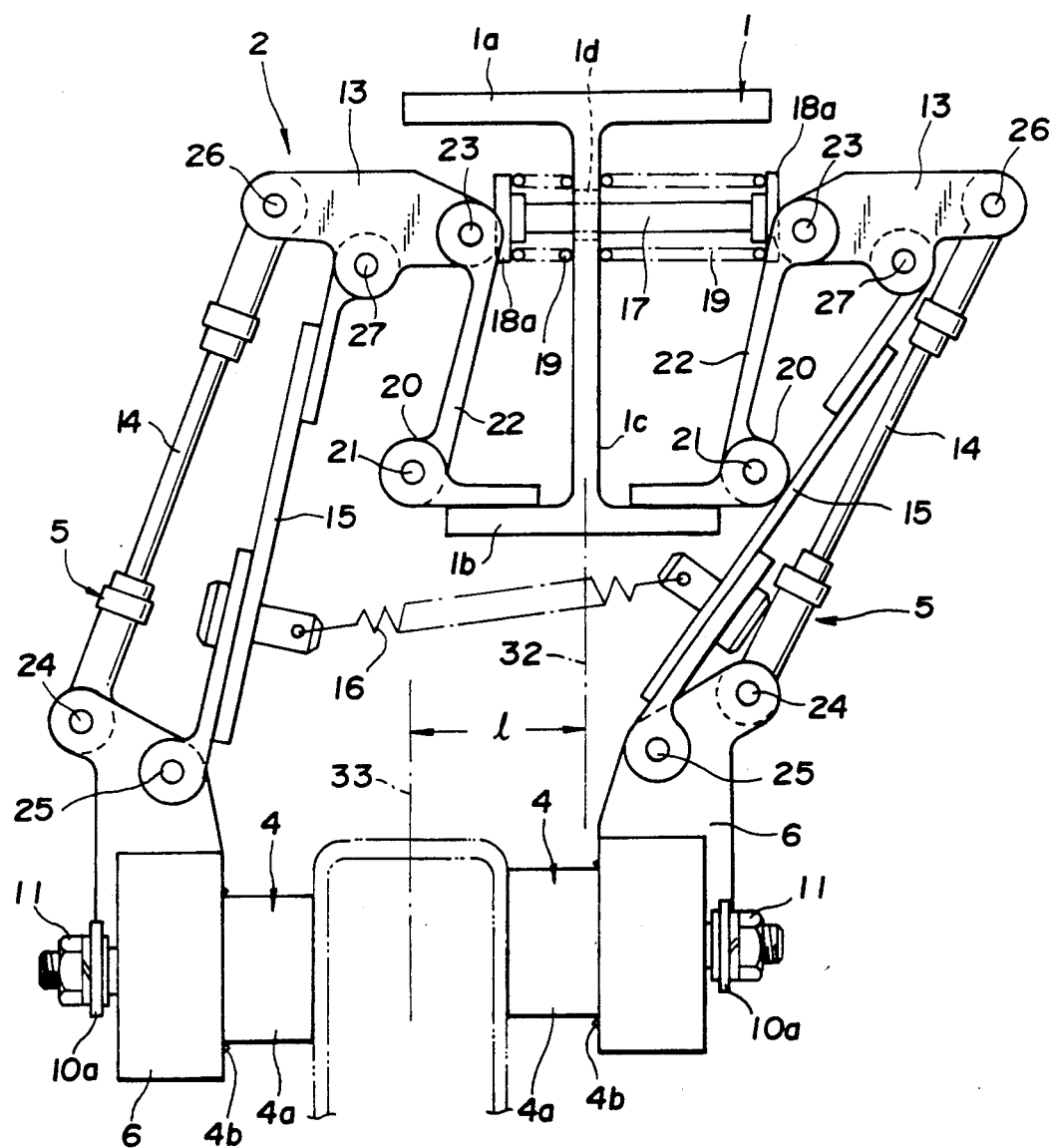

When the transport vehicle travels along curved tracks having a large radius of curvature, a relative variance having a very small dimension l results in the transverse direction of the truck body 31 of the transport vehicle between the center line 32 of the mounting member 1 extending in the longitudinal direction of the transport vehicle and the center line 33 of the trolley rail 3. Note that the center line 33 is shown in FIGS. 6 and 7. In this case, the positions of the support arms 5 relative to the mounting member 1 do not change. The position of each of the collector shoes 4 relative to each of the collector shoe holders 6 change while the elastic forces of the coil springs 12 are keeping the main bodies 4a of the collector shoes 4 coming in contact with the surfaces on both sides of the trolley rail 3.

When the transport vehicle travels along curved rails having a small radius of curvature, a relative variance having a larger dimension l results in the transverse direction of the truck body 31 of the transport vehicle between the center line 32 of the mounting member 1 in the longitudinal direction of the transport vehicle and the center line 33 of the trolley rail 3. In this case, the collector shoe 4 supported by one of the support arms 5 is strongly pressed against the trolley rail 3 as shown in FIG. 6. This support arm 5 rotates with its upper end, (the first end) as center of rotation, inclining in the transverse direction of the support vehicle. Similarly, the other support arm 5 also rotates wtih its upper end, (the first end) as center of rotation, inclining in the same direction due to the attraction force of the spring 16. The upper ends, (the first ends), of the two joint arms 14 and 15 forming one of the support arms 5 are rotatably supported to the arm supporting element 13 of the supporting member 2 by the axes 26 and 27, (the first axis). On the other hand, the lower ends, (the second ends), of the two joint arms 14 and 15 forming the support arm 5 are rotatably connected to the collector shoe holder 6 by the axes 24 and 25 (the second axes). As such, the joint arms 14 and 15 form a parallelogram linkage in conjunction with the axes 24, 25, 26 and 27. Accordingly, each collector shoe holder 6 moves along the transverse direction of the truck body 31 of the transport vehicle keeping each of the contacting surfaces of the collector shoes 4 in parallel with each of the side surfaces of the trolley rail 3. Accordingly, good contact between the main body 4a of the collector shoe 4 and the trolley rail 3 is maintained. And further, no relative inclination is formed between the contact area of the main body 4a and the surface on each side of the trolley rail 3. The elastic force of the return springs 19 installed between the supporting member 2 and the mounting member 1 is larger than that of the spring 16 and equal to or larger than that of the coil springs 12. Accordingly, for a relative variance in a relatively small dimension l, the position of the supporting member 2 relative to the mounting member 1 hardly changes, keeping the positions of the upper ends, (the first ends), of the two support arms 5 symmetrical to the center line 32 of the mounting member 1.

When the transport vehicle travels along curved tracks having a smaller radius of curvature, a relative variance having an even larger dimension l results in the transverse direction of the truck body 31 of the transport vehicle between the center line 32 of the mounting member 1 extending in the longitudinal direction of the transport vehicle and the center line 33 of the trolley rail 3. In this case, the joint arm 15 of the support arm 5 inclining toward the inside of the truck body 31 of the transport vehicle (the right support arm 5 shown in FIG. 7) comes in contact wtih the external surface of the bearing 20 fixed on the lower plate 1b of the mounting member 1 as shown in FIG. 7. As the support arm 5 further inclines toward the inside of the truck body 31 of the transport vehicle, the support arm 5 rotates with the contact point between its joint arm 15 and the bearing 20 as a center of rotation, pulling the supporting member 2 in the transverse direction of the truck body 31 of the transport vehicle. The supporting member 2 is supported to the mounting member 1 by two mount arms 22. The lower end (the first end) of each of the mount arms 22 is rotatably supported to the lower plate 1b of the mounting member 2 by the axis 21 (the third axis). The upper end (the second end) of each of the mount arm 22 is rotatably connected to the arm supporting element 13 of the supporting member 2 by the axis 23 (the fourth axis). As such, the mount arms 22 from a parallelogram linkage in conjunction with the axes 21 and 23. Accordingly, the position of the supporting member 2 relative to the mounting member 1 can be shifted in the transverse direction of the truck body 31 of the transport vehicle, allowing for a larger inclination of the support arm 5. At that time, the shifted position of the supporting member 2 causes spring force for restoring the supporting member 2 to the original and neutral position thereof to be accumulated in one of the return springs 19.

Though the inclination of the support arms 5 becomes substantially large, good contact between the main bodies 4a of the collector shoes 4 and the surfaces on both sides of the trolley rail 3 is maintained because the joint arms 14 and 15 of each of the support arms 5 form a parallelogram linkage as described above. In addition, no relative inclination is formed between the contact area of the main body 4a of the collector shoe 4 and the surface on each side of the trolley rail 3. As the radius of curvature of the curved tracks along which the transport vehicle is traveling gradually increases, the dimension l of the relative variance described previously decreases and the spring force accummulated in the springs 19 restores the supporting member 2 to its original and neutral position. During that time, the elastic force of the spring 16 does not change because its total length remains substantially the same. Accordingly, the contact pressure applied by the collector shoes 4 to the trolley rail 3 also remains unchanged as well.

FIG. 8 shows an overall side view of the embodiment described above. As shown in the figure, a unit of the mounting member 1 is provided with three sets of support arms 5 shown in FIGS. 1 and 2 which are assembled at adjacent locations to constitute a current collecting apparatus of a linear motor car. It should be noted, however, that applications of the invention are not limited to a current collecting apparatus comprising three assemblies of support arms 5. The invention can also be applied to a current collecting apparatus comprising any arbitrary number of assemblies of support arms 5 depending upon the size and the transport power of the transport vehicle.

In the description given so far, the explanation of the invention is based on an embodiment in its best mode. As described previously, applications of the invention are not restricted to the embodiment described above. In the embodiment explained so far, for example, the movement of the supporting member 2 in the transverse direction of the truck body 31 of the transport vehicle is caused by the joint arm 15 of the support arm 15 inclining in the transverse direction toward the inside of the truck body 31 of the transport vehicle coming in contact with the bearing 20 fixed on the mounting member 1. However, the supporting member 2 can also be moved in the transverse direction of the truck body 31 of the transport vehicle by the joint arm 15 of the support arm 5 inclining in the transverse direction toward the outside of the truck body 31 of the transport vehicle coming in contact with a portion of the arm supporting element 13 or a portion of the collector shoe holder 6.

When the transport vehicle travels along curved tracks having a large radius of curvature, a relative variance having a very small dimension l results in the transverse direction of the truck body 31 of the transport vehicle between the center line 32 of the mounting member 1 in the longitudinal direction of the transport vehicle and the center lien 33 of the trolley rail 3 as shown in FIG. 6. For a smaller range of dimension of the relative variance, the position of the supporting member 2 relative to the mounting member 1 does not change. Accordingly, for transport vehicles traveling along tracks composed of only straight tracks and curved tracks having large radius of curvature, the supporting member 2 and the mount arms 22 can be eliminated from the current collecting apparatus for such transport vehicles. In this case, the joint arms 14 and 15 forming the support arms 5 can be rotatably supported to the mounting member 1 directly by the axes 26 and 27, respectively, wtih the positions of the support arms 5 kept symmetrical to the center line 33 of the mounting member 1 extending in the longitudinal direction of the transport vehicle.

What is claimed is:

1. A current collecting apparatus for a transport vehicle comprising:
    a mounting member fixed to said transport vehicle through an insulator,
    a couple of support arms with first ends thereof rotatably supported to said mounting member and positions thereof made symmetrical to a center line of said mounting member parallel to the longitudinal direction of said transport vehicle,
    a couple of collector shoe holders each rotatably connected to second ends of each of said support arms and
    a couple of collector shoes each slidably supported in each of said collector shoe holders together with a spring which presses each of said collector shoes toward said center line whereby each of said collector shoes comes in contact with opposite side surfaces of a trolley rail installed on a track and connected to an electric power source.

2. A current collecting apparatus for a transport vehicle according to claim 1, wherein each of said support arms comprises a couple of joint arms, a first end of each of said joint arms is rotatably supported to said mounting member by a first axis parallel to a center line of said mounting member in the longitudinal direction of said transport vehicle, respectively, a second end of each of said joint arms is rotatably connected to each of said collector shoe holders by a second axis parallel to said center line in the longitudinal direction of said transport vehicle, respectively, and the distance between said first axis and said second axis of one of said join arms forming one of the support arms is made equal to the distance between said first axis and said second axis of the other one of said joint arms forming said support arm, respectively, and the distance between said first axes of each of the support arms is made equal to the distance between said second axes of said support arm, respectively, whereby each of said support arms provides a parallelogram linkage formed by said joint arms in conjunction with said first and second axes.

3. A current collecting apparatus for a transport vehicle according to claim 2, wherein a spring means is provided between said two support arms with an elastic force thereof directed to press said collector shoes against said trolley rail so as to keep said collector shoes in contact with said trolley rail 4. A current collecting apparatus for a transport vehicle according to claim 1, wherein said mounting member is provided with a supporting member wherein the position of said supporting member is movable with respect to said mounting member in a transverse direction of said transport vehicle, a return spring is provided between said mounting member and said supporting member for restoring said supporting member in its neutral position, and each of said support arms is rotatably supported at the first end thereof to each of supporting elements formed at both ends of said supporting member, respectively.

5. A current collecting apparatus for a transport vehicle according to claim 4, wherein a spring means is provided between said two support arms with an elastic force thereof directed to press said collector shoes against said trolley rail so as to keep said collector shoes in contact with said trolley rail 6. A current collecting apparatus for a transport vehicle according to claim 4, wherein said supporting member is extended wtih the longitudinal direction thereof perpendicular to the center line of said mounting member which is parallel to a longitudinal direction of said transport vehicle, each of said support arms comprises a couple of joint arms, a first end of each of said joint arms is rotatably supported to each arm supporting element of said supporting member by a first axis parallel to the longitudinal direction of said transport vehicle, respectively, a second end of each of said joint arms is rotatably connected to each of said collector shoe holders by a second axis parallel to the longitudinal direction of said transport vehicle, respectively, and the distance between said first axis and said second axis of one of said joint arms forming each of the support arms is made equal to the distance between said first axis and said second axis of the other one of said joint arms forming said support arm, respectively, and the distance between said first axes of each of the support arms is made equal to the distance between said second axes of said support arm, respectively, whereby each of said support arms provides a parallelogram linkage formed by said joint arms in conjunction with said first and second axes.

7. A current collecting apparatus for a transport vehicle according to claim 6, further comprising a couple of mount arms, a first end of each of said mount arms is rotatably connected to said supporting member by a third axis parallel to the longitudinal direction of said transport vehicle, a second end of each of said mount arms is rotatably connected to said mounting member by a fourth axis parallel tot he longitudinal direction of said transport vehicle, and a return spring installed between each of said third axis of said mount arm and said mounting member, respectively.

8. A current collecting apparatus for a transport vehicle according to claim 6, wherein a spring means is provided between said two support arms with an elastic force thereof directed to press said collector shoes against said trolley rail so as to keep said collector shoes in contact with said trolley rail.

* * * * *